United States Patent
Rao et al.

(10) Patent No.: US 10,573,145 B2
(45) Date of Patent: *Feb. 25, 2020

(54) SYSTEM AND METHOD FOR DETECTING AND SUPPRESSING FIRE USING WIND INFORMATION

(71) Applicant: Tyco Fire & Security GmbH, Neuhausen am Rheinfall (CH)

(72) Inventors: Manjuprakash Rama Rao, Bangalore (IN); Surajit Borah, Bangalore (IN); Sreenath K. Ramanna, Bangalore (IN); P. U. Kamruddin, Bangalore (IN); Andrew Rynkiewicz, Bracknell (GB); Clive Weston, Frimley (GB)

(73) Assignee: Tyco Fire Products, Lansdale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,001

(22) Filed: May 7, 2018

(65) Prior Publication Data

US 2018/0301010 A1    Oct. 18, 2018

Related U.S. Application Data

(63) Continuation of application No. 15/105,311, filed as application No. PCT/IB2014/066989 on Dec. 17, 2014, now Pat. No. 9,990,825.

(Continued)

(51) Int. Cl.
*G08B 17/12* (2006.01)
*A62C 37/36* (2006.01)
(Continued)

(52) U.S. Cl.
CPC ............ *G08B 17/125* (2013.01); *A62C 37/36* (2013.01); *B05B 12/082* (2013.01); *B05B 12/12* (2013.01);
(Continued)

(58) Field of Classification Search
CPC ...... G08B 17/12; G08B 17/125; G01J 5/0014; G01J 5/0018
See application file for complete search history.

(56) References Cited

U.S. PATENT DOCUMENTS

| 4,149,159 A | 4/1979 | Datwyler et al. |
| 4,195,286 A | 2/1980 | Galvin |

(Continued)

FOREIGN PATENT DOCUMENTS

| EP | 1 103 285 | 11/2000 |
| EP | 1 122 700 | 8/2001 |

(Continued)

OTHER PUBLICATIONS

Glockling, J. et al., "Development of a robotic local suppression system for the marine environment," Proceedings of the National Fire Protection Association Suppression and Detection Research and Applications Conference, Mar. 2008. Thirteen pages.

(Continued)

*Primary Examiner* — Fekadeselassie Girma
(74) *Attorney, Agent, or Firm* — HoustonHogle LLP

(57) ABSTRACT

A fire detection and suppression system correcting fire detection based on wind. Wind may affect both the apparent position of the fire detected by the fire detectors and also the suppressant jet being delivered by a monitor. Typically wind results in shifting of estimated fire location away from the real fire in the direction of wind. Similarly the suppressant jet will also be diverted in the same direction. The system comprises fire detectors for acquiring two-dimensional fire location information for a fire. A wind sensor acquires wind information, often in region of the fire. A system controller then compensates the three-dimensional fire location information based on the wind information. Additionally, the position of fog/jet monitors is preferably compensated based (Continued)

on the wind information. The jet pressure setting is also ideally determined based on the wind.

13 Claims, 16 Drawing Sheets

Related U.S. Application Data

(60) Provisional application No. 61/916,917, filed on Dec. 17, 2013.

(51) Int. Cl.

| | | |
|---|---|---|
| *B05B 12/08* | (2006.01) | |
| *B05B 12/12* | (2006.01) | |
| *G08B 29/18* | (2006.01) | |
| *G01J 5/00* | (2006.01) | |
| *G01P 5/00* | (2006.01) | |
| *G01P 13/00* | (2006.01) | |

(52) U.S. Cl.
CPC ............. *G01J 5/0018* (2013.01); *G01P 5/00* (2013.01); *G01P 13/0006* (2013.01); *G08B 29/185* (2013.01)

(56) References Cited

U.S. PATENT DOCUMENTS

| | | | |
|---|---|---|---|
| 4,749,862 A | 6/1988 | Yoshida et al. | |
| 4,821,805 A | 4/1989 | Saito et al. | |
| 4,909,329 A | 3/1990 | Yoshida et al. | |
| 5,107,128 A * | 4/1992 | Davall | F23N 5/082 250/216 |
| 5,165,482 A * | 11/1992 | Smagac | A62C 3/0214 169/13 |
| 5,937,077 A | 8/1999 | Chan et al. | |
| 6,267,539 B1 | 7/2001 | Mihalcin | |
| 6,819,237 B2 | 11/2004 | Wilson et al. | |
| 8,714,466 B2 * | 5/2014 | Trapp | A62C 31/005 169/24 |
| 9,449,240 B2 | 9/2016 | Lorenzoni | |
| 10,255,506 B2 * | 4/2019 | Lorenzoni | G06T 7/70 |
| 2002/0026431 A1 * | 2/2002 | Pedersen | G06Q 10/06 706/1 |
| 2004/0089735 A1 * | 5/2004 | Drechsel | A01G 25/09 239/195 |
| 2004/0129434 A1 * | 7/2004 | Tan | A62C 37/40 169/37 |
| 2004/0163827 A1 * | 8/2004 | Privalov | A62C 3/0271 169/46 |
| 2004/0249590 A1 * | 12/2004 | Ota | G01D 9/005 702/79 |
| 2004/0254652 A1 * | 12/2004 | Ota | G08B 25/009 700/12 |
| 2008/0248450 A1 * | 10/2008 | Li | G08B 31/00 434/226 |
| 2009/0101368 A1 | 4/2009 | Lozier | |
| 2010/0042263 A1 * | 2/2010 | Jacobsen | A01G 25/16 700/284 |
| 2010/0070097 A1 * | 3/2010 | Morgenstern | A62C 35/64 700/284 |
| 2010/0117839 A1 | 5/2010 | Lee | |
| 2011/0155397 A1 * | 6/2011 | Icove | G01K 11/006 169/43 |
| 2011/0295569 A1 * | 12/2011 | Hamke | G01P 5/00 703/2 |
| 2012/0001760 A1 | 1/2012 | Harchanko | |
| 2012/0314066 A1 * | 12/2012 | Lee | G08B 17/125 348/143 |
| 2013/0090772 A1 * | 4/2013 | Pfrenger | G05D 3/12 700/284 |
| 2013/0106312 A1 * | 5/2013 | Beardsley | H05B 37/0227 315/312 |
| 2014/0028803 A1 * | 1/2014 | Hanses | H04N 13/282 348/47 |
| 2014/0300888 A1 * | 10/2014 | Duffey | G01S 17/58 356/28 |
| 2014/0334674 A1 * | 11/2014 | Lorenzoni | G08B 17/125 382/103 |
| 2015/0021054 A1 * | 1/2015 | McNamara | G05D 16/20 169/46 |
| 2016/0321900 A1 * | 11/2016 | Rao | A62C 37/36 |
| 2016/0328937 A1 | 11/2016 | Rao et al. | |
| 2016/0328938 A1 * | 11/2016 | Rao | A62C 37/36 |
| 2017/0095682 A1 * | 4/2017 | Combs | A62C 27/00 |
| 2017/0153327 A1 * | 6/2017 | Nishioka | G01S 7/484 |
| 2017/0328345 A1 * | 11/2017 | Grober | G01P 13/045 |
| 2018/0292661 A1 * | 10/2018 | Songa | G06T 11/60 |

FOREIGN PATENT DOCUMENTS

| | | |
|---|---|---|
| EP | 2 264 677 | 12/2010 |
| GB | 2 468 398 A | 9/2010 |
| JP | H5 266373 | 10/1993 |
| WO | WO 94/06517 | 3/1994 |
| WO | WO 2002/081031 | 10/2002 |

OTHER PUBLICATIONS

Glockling, J. et al., "Shipboard Intelligent Fire Suppression Systems," Proceedings of the National Fire Protection Association Suppression and Detection Research and Applications Conference, Mar. 2007. Thirteen pages.

Infra-Red Flame Detection, Flame Vision FV 300 User Manual, UM 35, Issue 3, 120-415-886,Tyco Safety Products, copyright 2008 Thorn Security Ltd. Sixty-eight pages.

International Preliminary Report on Patentability, dated Jun. 30, 2016, from International Application No. PCT/IB2014/066989, filed Dec. 17, 2014. Twenty pages.

International Preliminary Report on Patentability, dated Jun. 30, 2016, from International Application No. PCT/IB2014/066987, filed on Dec. 17, 2014. Nine pages.

International Preliminary Report on Patentability, dated Jun. 30, 2016, from International Application No. PCT/IB2014/066988, filed on Dec. 17, 2014. Fourteen pages.

International Search Report and Written Opinion of the International Searching Authority, dated Mar. 12, 2015, from International Application No. PCT/IB2014/066989, filed Dec. 17, 2014. Twenty-two pages.

International Search Report and Written Opinion of the International Searching Authority, dated Mar. 3, 2015, from International Application No. PCT/IB2014/066988, filed Dec. 17, 2014. Sixteen pages.

International Search Report and Written Opinion of the International Searching Authority, dated Mar. 5, 2015, from International Application No. PCT/IB2014/066987, filed Dec. 17, 2014. Eleven pages.

Kaiser, T., "Fire Detection with Temperature Sensor Arrays," Security Technology, 2000. Proceedings, IEEE 34th Annual International Conference, Oct. 23, 2000, pp. 262-268.

Munoz, M. et al., "Analysis of the geometric and radiative characteristics of hydrocarbon pool fires," Combustion and Flame, vol. 139, No. 3, Nov. 14, 2004, pp. 263-277.

Ukil, A., et al., "Distributed Temperature Sensing: Review of Technology and Applications," IEEE Sensors Journal, vol. 12, No. 5, May 2012, pp. 885-892.

Xia, D., et al., "A method research on fire source localization using dual-line gas sensor array," Intelligent Control and Automation, 2008. Proceedings of the 7th World Congress on Intelligent Control and Automation, Jun. 25-27, 2008, pp. 5862-5865.

First Examination Report, dated Jul. 16, 2019, for European Patent Application No. 14 825 187.9. 7 pages.

\* cited by examiner

340

| Speed | 2km/hr | 4km/hr | 6 km/hr |
|---|---|---|---|
| Distance to fire | | | |
| 5 meter | $D_{00}$ | $D_{01}$ | $D_{02}$ |
| 10 meter | $D_{10}$ | $D_{11}$ | $D_{12}$ |
| 15 meter | $D_{20}$ | $D2_1$ | $D_{22}$ |

| Cross Wind Speed | 2km/hr | 4km/hr | 6 km/hr |
|---|---|---|---|
| Distance to fire | | | |
| 5 meter | $E_{00}$ | $E_{01}$ | $E_{02}$ |
| 10 meter | $E_{10}$ | $E_{11}$ | $E_{12}$ |
| 15 meter | $E_{20}$ | $E2_1$ | $E_{22}$ |

FIG. 15 ated Applications
SYSTEM AND METHOD FOR DETECTING AND SUPPRESSING FIRE USING WIND INFORMATION

RELATED APPLICATIONS

This application is a Continuation of U.S. patent application Ser. No. 15/105,311, filed on Jun. 16, 2016, which is a § 371 National Phase Application of International Application No. PCT/IB2014/066989, filed on Dec. 17, 2014, which claims the benefit under 35 USC 119(e) of U.S. Provisional Application No. 61/916,917, filed on Dec. 17, 2013, both of which are incorporated herein by reference in their entirety.

This application is related to U.S. application Ser. No. 15/105,308 filed on Dec. 17, 2014, having the same inventors, entitled "System and Method for Monitoring and Suppressing Fire", now U.S. Patent Publication No. 2016/0321900 A1, and U.S. application Ser. No. 15/105,304 filed on Dec. 17, 2014, having the same inventors, entitled "System and Method for Detecting Fire Location", now U.S. Patent Publication No. 2016/0328937 A1, all of which are incorporated herein by reference in their entirety. All of the afore-mentioned applications are incorporated herein by this reference in their entirety.

BACKGROUND OF THE INVENTION

The hazardous industry sector including oil & gas, alcohol, paper, wood, coal, plastic etc. inherently is engaged in handling highly inflammable substances in both indoor and outdoor conditions. The fires involving these substances have a tendency to spread fast and get out of control very quickly, causing enormous damage to life and property. There is ever increasing demand to enhance the safety of personnel and valuable assets from accidental fires.

Early and reliable detection of fires can be effective in controlling the spread of fire. For example, the FLAMEVision FV300 flame/fire detector can reliably detect fires as fire clusters with practically no false alarms. The FV300 or other video-based sensor systems (hence forth collectively referred to as spatially resolved fire detectors) provide an indication of the detected fire on (a planar) two-dimensional (2D) reference system. The fire detectors can output data which represent the center of the fire cluster as well as size of the fire cluster to thereby provide fire location information in the 2D plane of the sensor array.

Combining two-dimensional fire cluster center data from at least two fire detectors which have a common field of view of a fire can produce depth information which can be used to calculate a fire location on a three-dimensional grid. The estimated position of the fire can be used by control systems which can drive suppression devices (e.g., monitors) to deploy water/foam jets towards the fire.

SUMMARY OF THE INVENTION

Wind may affect both the apparent position of the fire detected by the fire detectors and also the suppressant jet being delivered by a monitor. Typically wind results in shifting of estimated fire location away from the real fire in the direction of wind. Similarly the suppressant jet will also be diverted in the same direction.

The present invention is directed both to the compensation of a calculated fire position based on wind measurements and offsets that are used in the deployment of fire suppressants based on the wind information.

In general according to one aspect, the invention features a fire detection system for correcting fire detection based on wind. The system comprises fire detectors for acquiring two-dimensional fire location information for a fire. A wind sensor acquires wind information, often in the region of the fire. A system controller then determines three-dimensional fire location information based on the two-dimensional fire location information from the fire detectors and compensates the three-dimensional fire location information based on the wind information.

In embodiments, a preprocessor module can be employed for averaging two-dimensional fire location information over time. And, in the illustrated embodiments, each fire detector comprises a two-dimensional infrared sensor array that generates the two-dimensional fire location information.

The system controller compensates the three-dimensional fire location information by calculating an effective displacement based on the cross wind velocity. Preferably, however, the compensation also takes into account a distance between at least one of the fire detectors and the fire. Additionally, the system controller preferably calculates a cross wind velocity for a coordinate system of the fire detectors.

In the preferred embodiment, additional wind sensors are provided for acquiring additional wind velocity information and the system controller generates a weighted average of the wind information based on distances between the wind sensors and the fire.

In general according to another aspect, the invention features a fire detection method for correcting fire detection based on wind. The method comprises acquiring two-dimensional fire location information for a fire with fire detectors, acquiring wind information for the fire, determining three-dimensional fire location information based on the two-dimensional fire location information from the fire detectors, and compensating the three-dimensional fire location information based on the wind information.

In general according to another aspect, the invention features a system for correcting fire suppression based on wind. The system comprises fire detectors for acquiring two-dimensional fire location information for a fire and a wind sensor for acquiring wind information. Monitors are provided for deploying fire suppressant. A system controller determines three-dimensional fire location information based on the two-dimensional fire location information from the fire detectors and determines an offset value for the monitor based on a distance between the monitor and the fire and the wind information. The system controller controls the monitor based on the offset value.

In embodiments, the system controller determines a cross wind component and an axial wind component from the wind information. The system controller then controls a horizontal and vertical orientation of the monitor based on the cross wind component. A jet pressure of the monitor can also be controlled based on the axial wind component.

In general according to another aspect, the invention features a system and method for correcting fire suppression based on wind. The method comprises determining three-dimensional fire location information based on two-dimensional fire location information from fire detectors, acquiring wind information, and controlling deployment of fire suppressant based on a distance between the monitor and the fire and the wind information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 13 shows an exemplary wide compensation table 340 providing displacements due to wind as a function of wind speed, along the columns, and distance between the fire location and the fire detector FD, along the rows;

FIG. 15 shows a lookup table that summarizes wind induced drift as a function of distance between fire and the FJM and cross wind speed.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

There are existing products which provide fire location coordinates to direct a suppression device (e.g., fog/jet monitor) towards a direction of fire. However, the provisions on accuracy and robustness of the output fire location coordinates under various environmental conditions such as wind have not been realized. In general, the accuracy and reliability of the fire location output provided by the fire detection system depends on a number of known factors such as the inherent sensor characteristics (sensor resolution, range, response times, intensity (size) of fire etc.), relative orientations of multiple fire detectors, the extent of common or overlapping field of view shared by various fire detectors, and uncontrolled factors induced by ambient factors such as wind etc. Prior systems inadequately specify how the possible location errors due to above factors could be mitigated.

Embodiments of the invention improve the fire location estimation accuracy by a number of processing steps which help in increasing accuracy of reported fire locations and compensating for any residual errors in sensor outputs as well as effects of ambient conditions such as wind.

Figure 1:
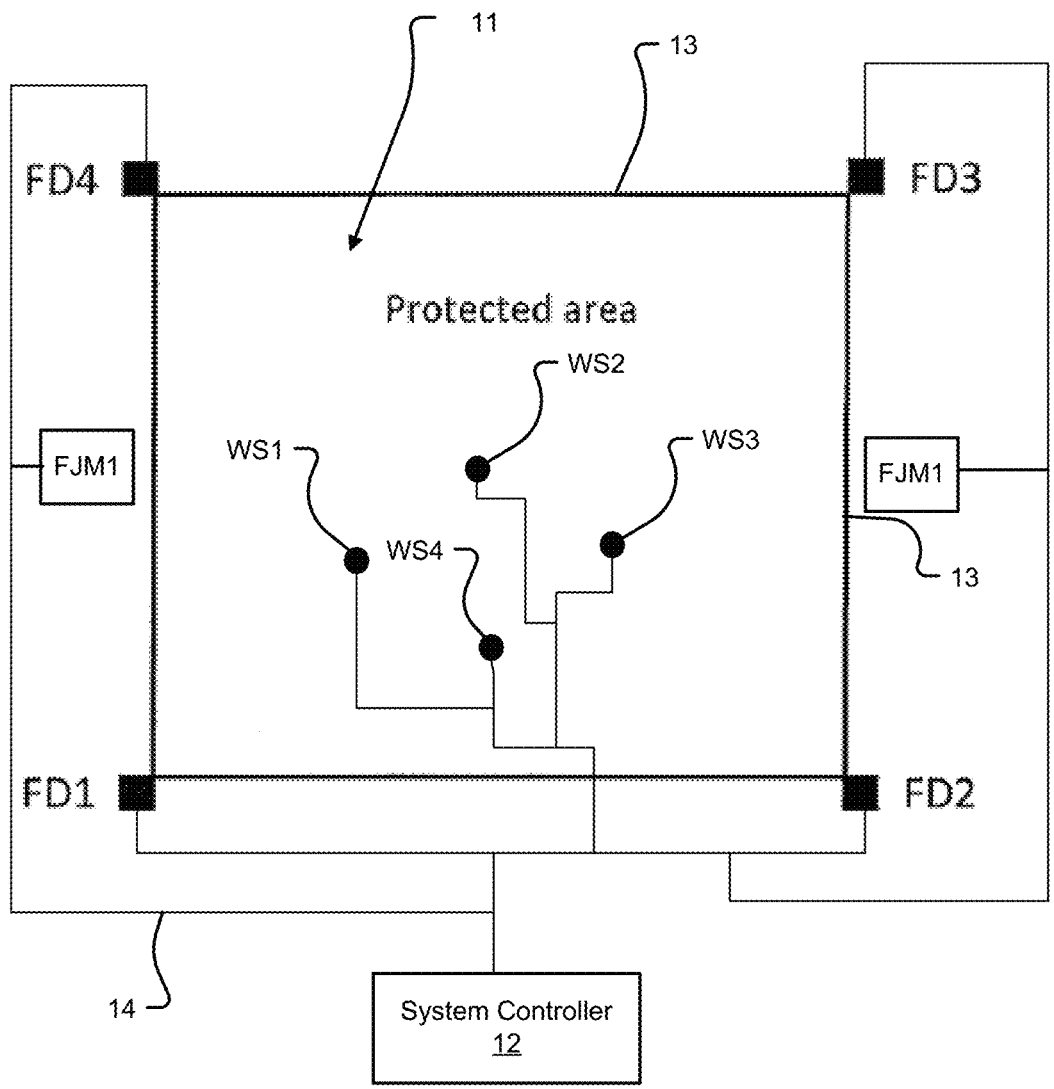
FIG. 1 is a schematic drawing of a fire detection and suppression system monitoring a protected area including wind sensors.

A reference layout of a fire detection system 10 is shown in FIG. 1.

The fire detection system 10 is installed around a perimeter 13 surrounding a protected area 11. The fire detection system 10 includes fire detectors FD positioned along the perimeter 13 of the protected area 11 to monitor this protected area 11 for fires. In this illustrated example, four fire detectors FD1-FD4 surround the protected area 11. The fire detectors are spatially resolved in that they can determine the location of the fires within their field of views.

The fire detection system 10 further includes a fire detector network 14. The fire detector network 14 allows for communication between the fire detectors FD1-FD4 and a system controller 12. In particular, the system controller 12 receives fire cluster information related to a fire from the fire detectors FD1-FD4 via the fire detector network 14.

The system controller 12 further controls a fire suppression system. In the illustrated example, two or more Fog/Jet Monitors FJM1, FJM2 are provided to deploy or direct a fire suppressant such as water or foam or other suppressant into the protected area 11. Preferably, the monitors are high pressure systems that incorporate electrical motors that the control the rotation and angle of the nozzles of the FJMs in the horizontal and vertical rotational axes and can dispense water and/or foam over a range of distances to cover the protected area 11.

Wind may affect both 2D output from fire detectors FD1-FD4 and also the suppressant jet being delivered by Fog/Jet Monitors FJM1, FJM2. Typically wind results in shifting of estimated fire location away from the real fire in the direction of wind. Similarly the suppressant jet will also be diverted in the same direction.

To facilitate compensation for these effects, wind sensors WS are to be appropriately installed in the protected area 11, around its perimeter 13, and/or possibly even next to the protected area 11. Readings from wind sensors are appended with 2D output from fire detectors to make a better estimation of fire location. Similarly instantaneous wind sensor readings are used in the control of FJM1 and FJM2 to appropriately correct the suppressant trajectory.

There are at least two reasons for having more than one wind sensor deployed in the area under protection. If there is large machinery and/or structures in the protected area 11 or adjacent to it, there will be an effect on the wind pattern within that area 11. As a result, speed and direction of the wind measured in one location may not be the same as the speed and direction of the wind at the location of the fire. Additionally, the wind itself may not uniform across the area, in which case, again, the wind measured in one location may not be the same as the speed and direction of the wind at the location of the fire.

When multiple wind sensors are deployed in the protected area, a weighted average of the wind velocity is used, with sensors close to the fire location getting a higher weight in the average than the sensors that are farther away.

Figure 2:
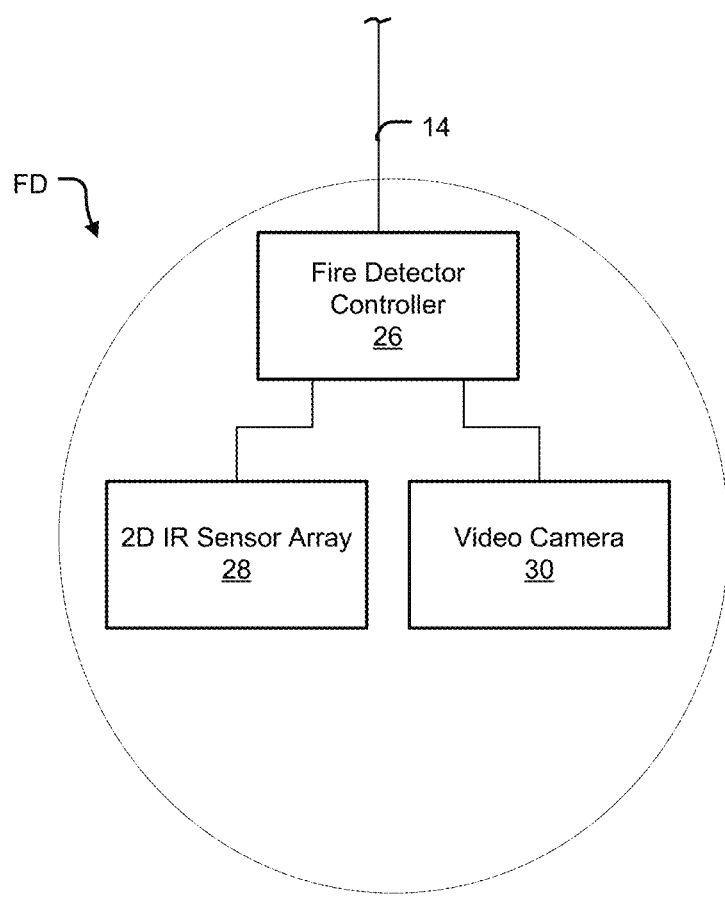
FIG. 2 is a block diagram of a fire detector.

As shown in FIG. 2, each of the fire detectors FD includes two main components: a fire detector controller 26, and a two-dimensional (2D) infrared (IR) sensor array 28. A video camera 30 is further included in some embodiments. The fire detectors' spatial resolution derives from their 2D detection capability based on the sensor array and/or the video camera.

The fire detectors FD are each capable of detecting fire based on specific sensing technologies such as infrared, thermal video, or a combination of these technologies. The fire detectors FD use the 2D IR sensor array 28 to detect fire using infrared technology. In particular, the fire detectors FD output the fire cluster information based on the response of the 2D IR sensor array 28. The group of sensors, i.e., pixels, on the 2D IR array that represent the detected fire are termed a fire cluster. This fire cluster information includes parameters related to a detected fire with reference to a 2D pixel array such as the center of the fire cluster within the 2D IR sensor array 28 and the size of the fire cluster being the number of sensors within the array that are in an alarm state, i.e., detecting IR radiation levels that exceed an alarm threshold.

The video camera 30 output is used to high-light the region of interest (detected fire) using suitable graphics overlay based on the fire cluster information.

Figure 3A:
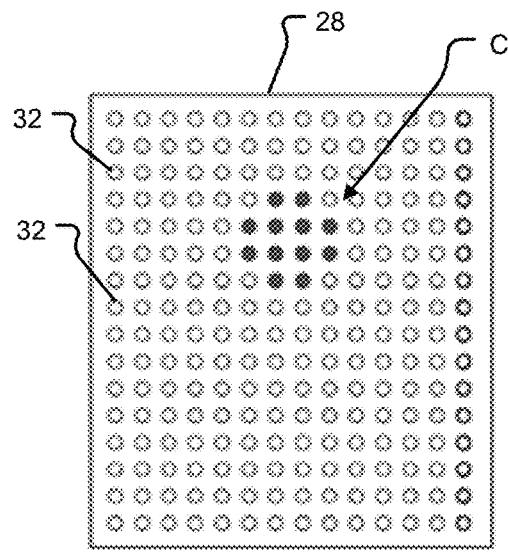
FIGS. 3A and 3B are schematic drawings of a two-dimensional infrared (IR) sensor array showing fire clusters.
Figure 3B:
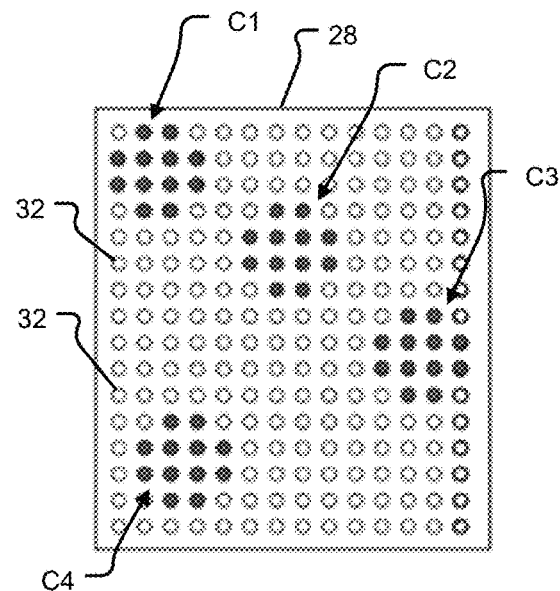
Figure 3C:
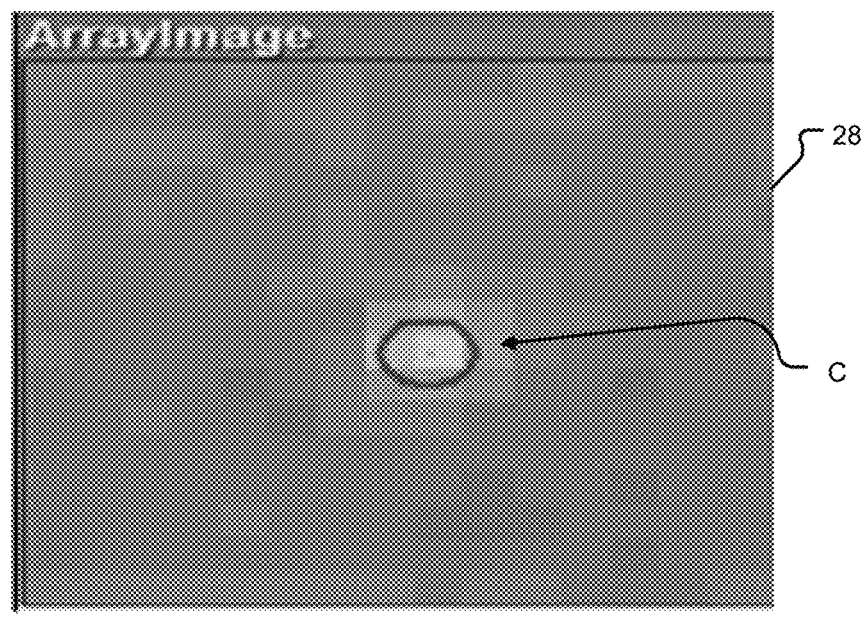
FIG. 3C is a false color IR image from the sensor array.

As shown in FIGS. 3A-3C, the IR sensor array 28 includes multiple IR sensors 32 that detect fire clusters C. In one particular example, the 2D IR sensor array 28 includes a 16 by 16 array of IR sensors 32 (e.g., highly sensitive pyro electric sensors) that detect if infrared light is of sufficient intensity and form to be indicative of a fire by reference to an alarm threshold. FIG. 3A illustrates a 2D IR sensor array 28 detecting one active fire cluster C and FIG. 3B illustrates a 2D IR sensor array 28 detecting multiple active fire clusters C1-C4.

FIG. 3C shows a coarse resolution IR image generated by the sensor array 28. It shows a single fire cluster C.

The fire cluster(s) C detected by the 2D IR sensor array 28 is (are) used in generating 2D fire location data for each fire giving rise to a fire cluster. Each fire detector FD outputs this fire cluster information, which includes fire cluster center, fire cluster size, and fire cluster alarm status information.

Figure 4:
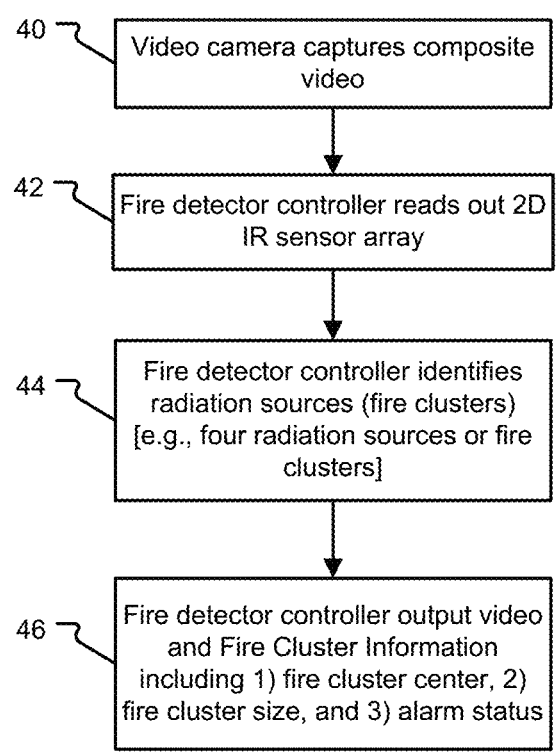
FIG. 4 is a flowchart illustrating the steps performed by the fire detector to detect a fire.

Each fire detector FD generates fire cluster information using the process shown in FIG. 4. In step 40, the video camera 30 captures composite video. Then, in step 42, the fire detector controller 26 reads out the 2D IR sensor array 28. The fire detector controller 26 identifies radiation sources (i.e., fire clusters) (step 44) by comparing each sensor response to an alarm threshold. In step 46, the fire detector controller 26 outputs video and fire cluster information including 1) fire cluster center, 2) fire cluster size, and 3) alarm status, which are sent to the controller 12 over the network 14.

Figure 5:
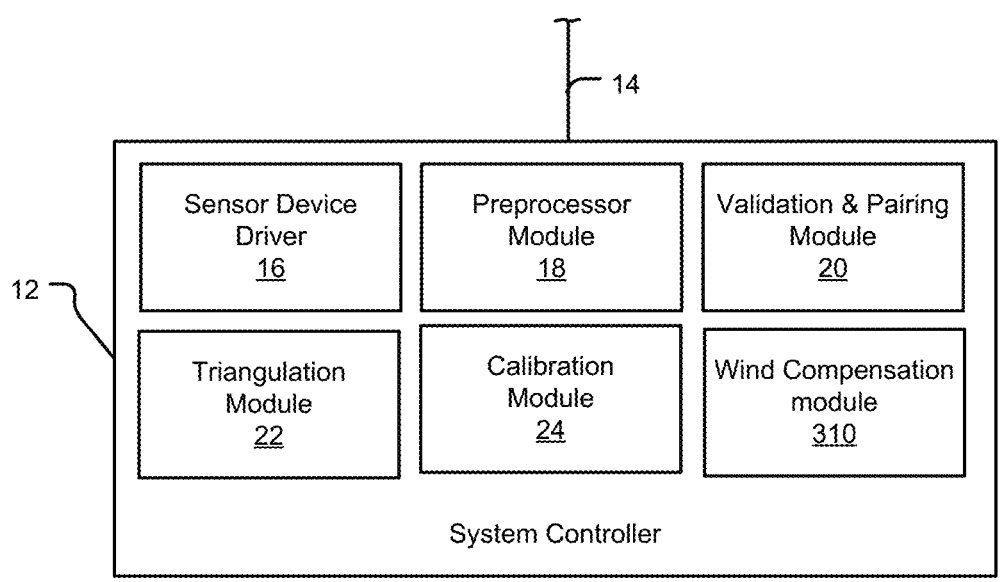
FIG. 5 is a block diagram of a system controller including functional components for implementing the fire detection process.

The system controller 12 includes a number of functional components shown in the FIG. 5 block diagram. The functional components include: a sensor device driver 16, a preprocessor module 18, a validation & pairing module 20, a triangulation module 22, a calibration module 24, and a wind compensation module 310.

The sensor device driver 16 provides an interface for receiving information and data from the fire detectors FD1-FD4. In particular, the sensor device driver 16 provides the function of interfacing with each fire detector FD via the fire detector network 14.

Figure 6:
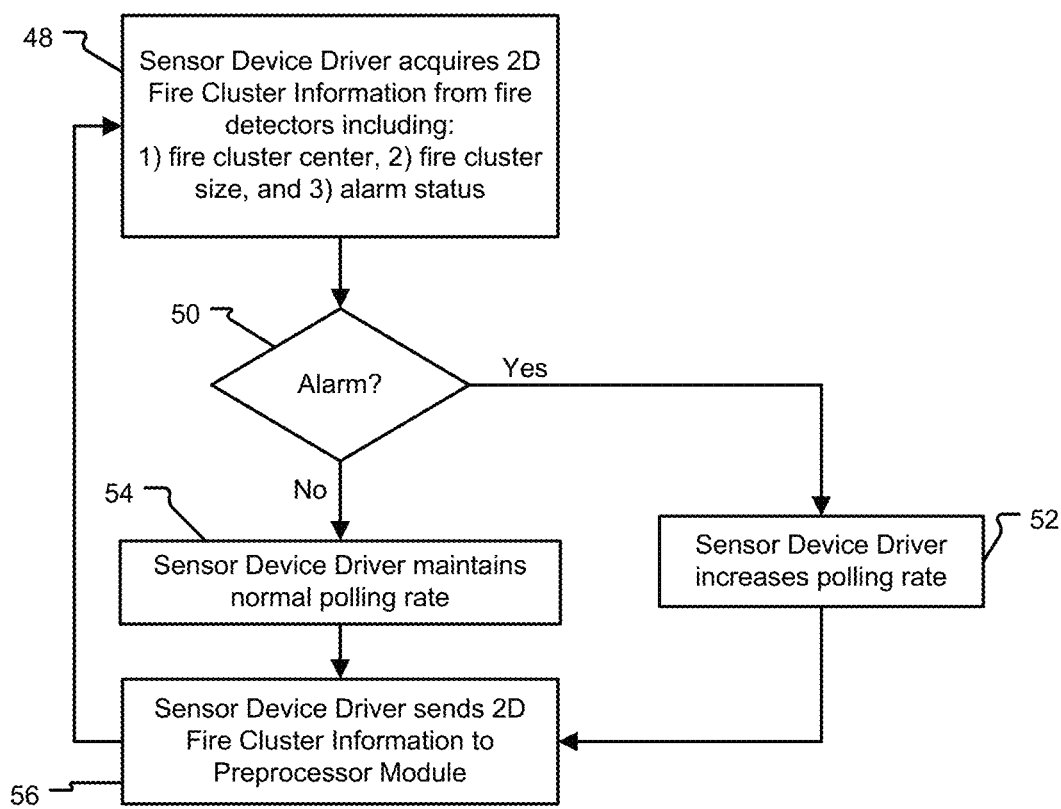
FIG. 6 is a flowchart illustrating the steps performed by a device driver of the system controller.

As shown in FIG. 6, the sensor device driver 16 acquires the 2D fire cluster information (fire cluster center, fire cluster size, and alarm status) from the fire detectors FD (step 48). In step 50, the sensor device driver 16 detects if there is an alarm condition in the fire cluster information. If an alarm condition is detected, the polling rate is increased to acquire fire cluster information (e.g., 2D fire location samples) more frequently from the fire detectors FD (step 52). Otherwise, if no alarm is detected, the sensor device driver 16 maintains a normal polling rate (step 54). At step 56, the sensor device driver 16 sends the received 2D fire cluster information to the preprocessor module 18.

Figure 7:
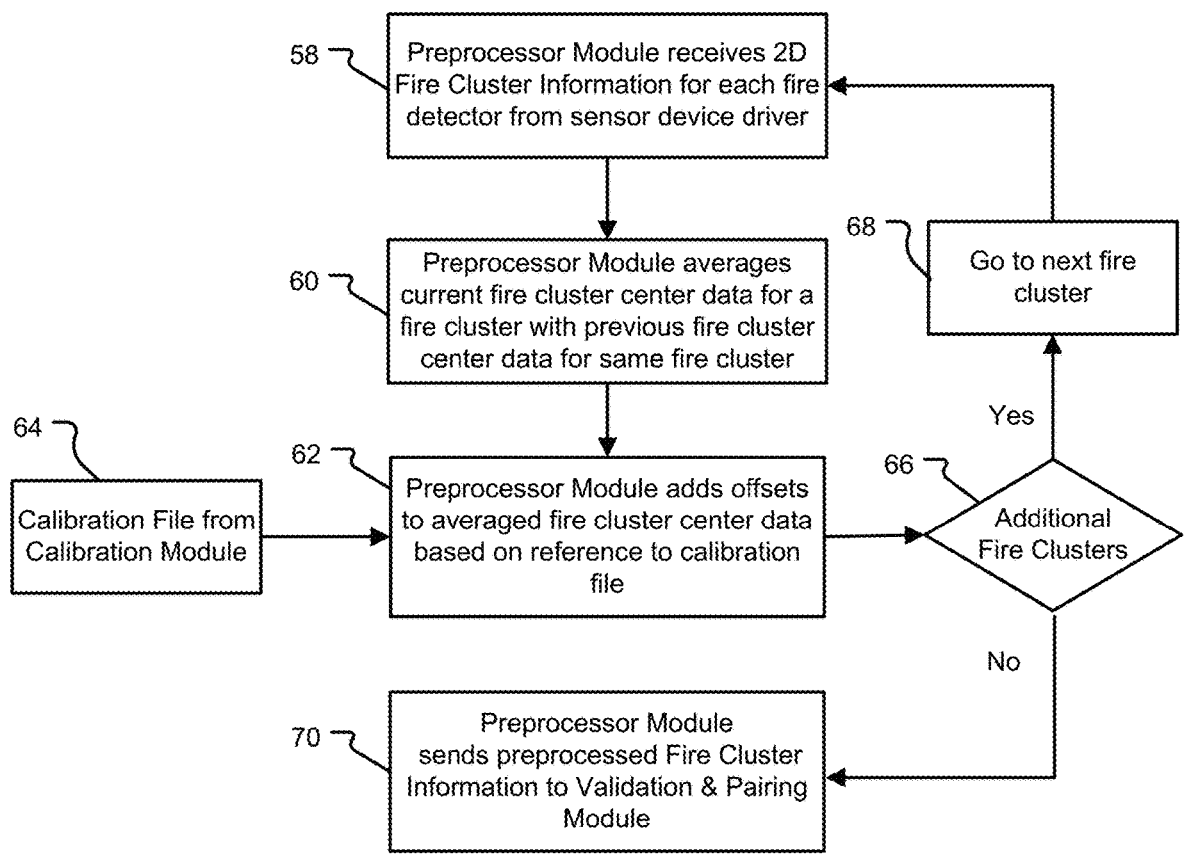
FIG. 7 is a flowchart illustrating the steps performed by a preprocessor module of the system controller.

As shown in FIG. 7, the preprocessor module 18 receives 2D fire cluster information for each fire detector FD from the sensor device driver 16 (step 58). In step 60, the preprocessor module 18 averages current fire cluster center data for a fire cluster C with previous fire cluster center data for the same fire cluster C. In one implementation, the preprocessor module 18 averages fire location data over configurable time windows in order to reduce the effects of wind-induced noise in the cluster center information. In step 62, the preprocessor module 18 adds offsets to averaged fire cluster center data based on reference to a calibration file. The calibration file is received by the preprocessor module 18 from the calibration module 24 (step 64). In particular, these offsets may be derived, for example, from a calibration or sensor alignment process which is undertaken on standalone fire detectors FD or during installation.

In step 66, the preprocessor module 18 determines if there are additional fire clusters C. If there are additional fire clusters C, the next fire cluster C is run through steps 58-62 of the preprocessor module 18 (step 68). If there are no additional fire clusters C, the preprocessor module 18 sends the preprocessed fire cluster information to the validation & pairing module 20.

Figure 8:
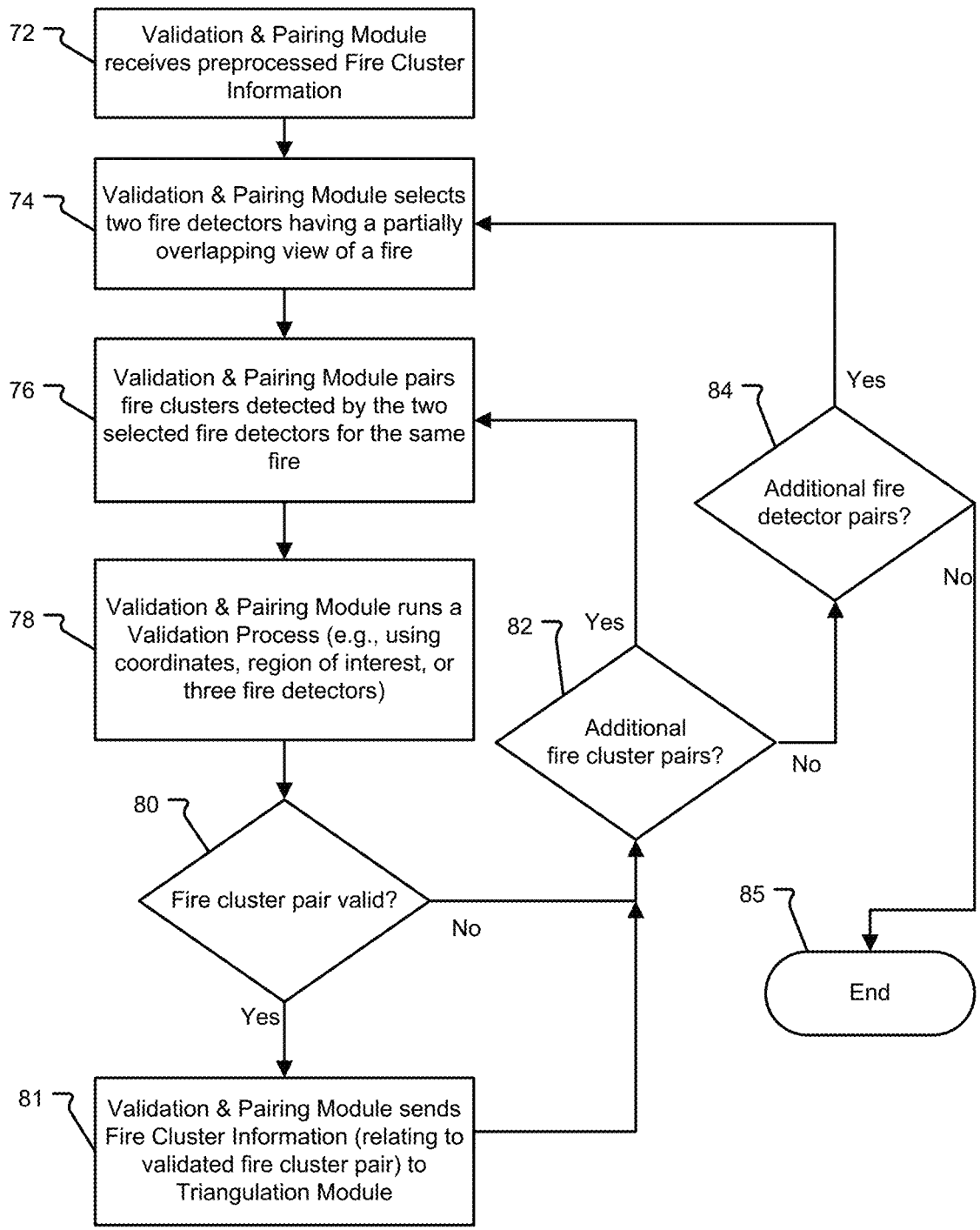
FIG. 8 is a flowchart illustrating the steps performed by a validation & pairing module of the system controller.

As shown in FIG. 8, the validation & pairing module 20 receives the preprocessed fire cluster information in step 72. In step 74, the validation & pairing module 20 selects two fire detectors FD1, FD2 as having a partially overlapping view 15 of a Fire (see FIG. 9). This partially overlapping view 15 (i.e., common field of view) is based on overlap between the field of view FOV-1 of the first fire detector FD1 and the field of view FOV-2 of the second fire detector FD2.

The validation & pairing module 20 pairs fire clusters C detected by the two selected fire detectors FD1, FD2 for the same fire (step 76). In step 78, the validation & pairing module 20 runs a validation process (e.g., using coordinates, region of interest, or three fire detectors). The validation process 78 is utilized to consistently pair fire clusters C that represent a unique fire.

The validation process 78 ensures that only consistently paired fire cluster data is further passed along to a triangulation algorithm of the triangulation module 22. Based on the validation process 78, the fire cluster pair is either valid or invalid (step 80). The validation & pairing module 20 then determines, at step 82, if there are additional fire cluster pairs and if so steps 76 and 78 are repeated for the new pair. If there are no additional fire cluster pairs, the validation & pairing module 20 determines if there are additional fire detector pairs at step 84 and if so steps are repeated to validate fire cluster pairs for the new fire detector pair. Otherwise, the process ends at step 85. If the fire cluster pair is valid, the validation & pairing module 20 sends the fire cluster information (relating to validated fire cluster pair) to the triangulation module 22.

Figure 9:
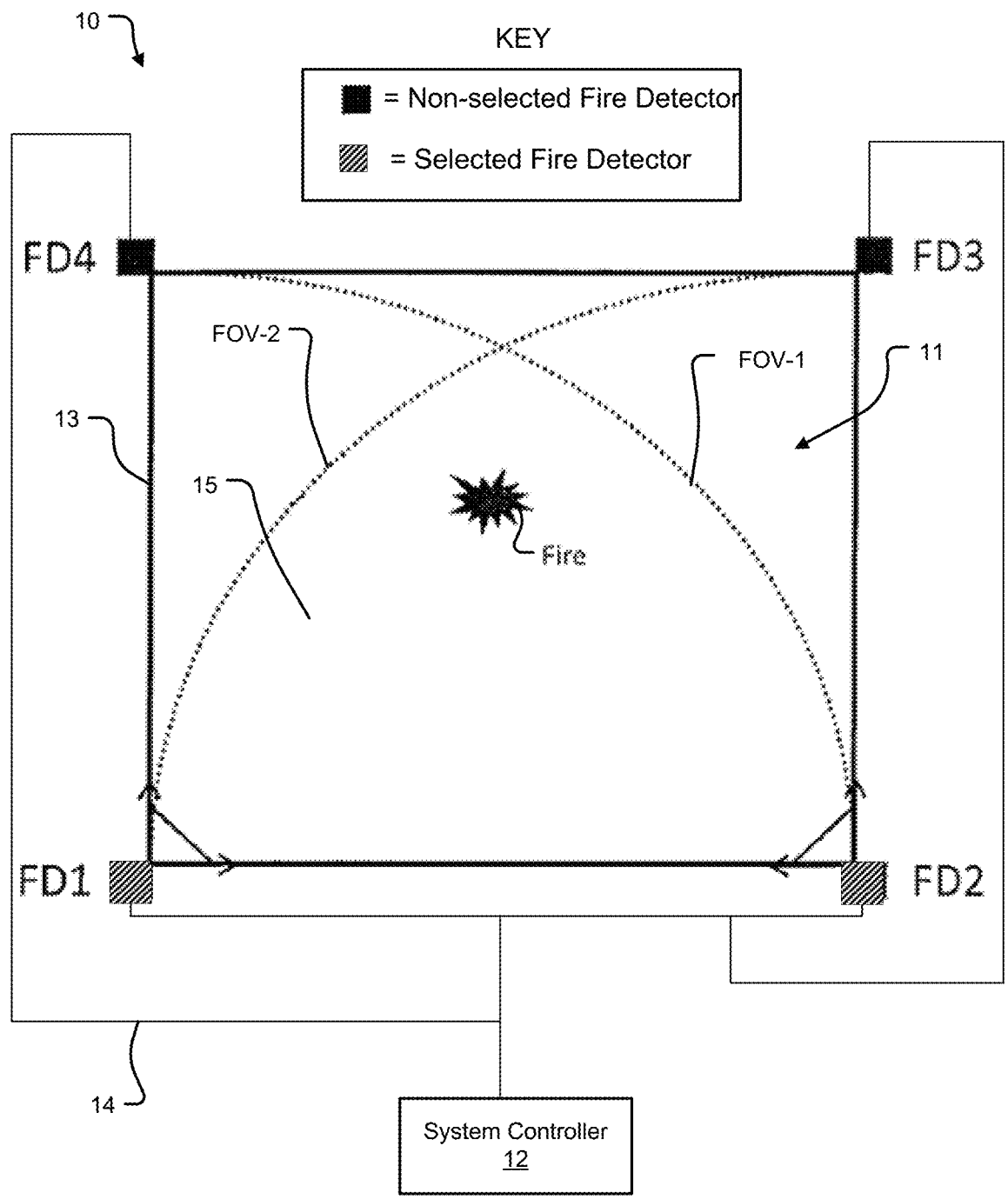
FIG. 9 is a schematic drawing of the fire detection system including two fire detectors having a partially overlapping view (i.e., common field of view) of a fire.

In one example, the validation of fire cluster pair relies on sensor placement geometry. A pair of fire detectors FD1, FD2 is involved along with a triangulation algorithm to compute the fire location when the fire occurs in their partially overlapping view 15 (i.e., common field of view). This partially overlapping view 15 or common field of view is between the first fire detector's field of view FOV-1 and the second fire detector's field of view FOV-2 as shown in the example of FIG. 9. The triangulation algorithm of the triangulation module 22 uses a pair of fire clusters C as input each of which appear in the individual fire detectors FD1, FD2 of the detectors pair.

The validation and pairing module ensures that this input fire cluster pair corresponds to a unique fire. Otherwise, the incorrect pairing of fire clusters C leads to improper computation of a fire location. Therefore, the pair of fire clusters needs to be validated prior to input to the triangulation module 22.

Figure 10A:
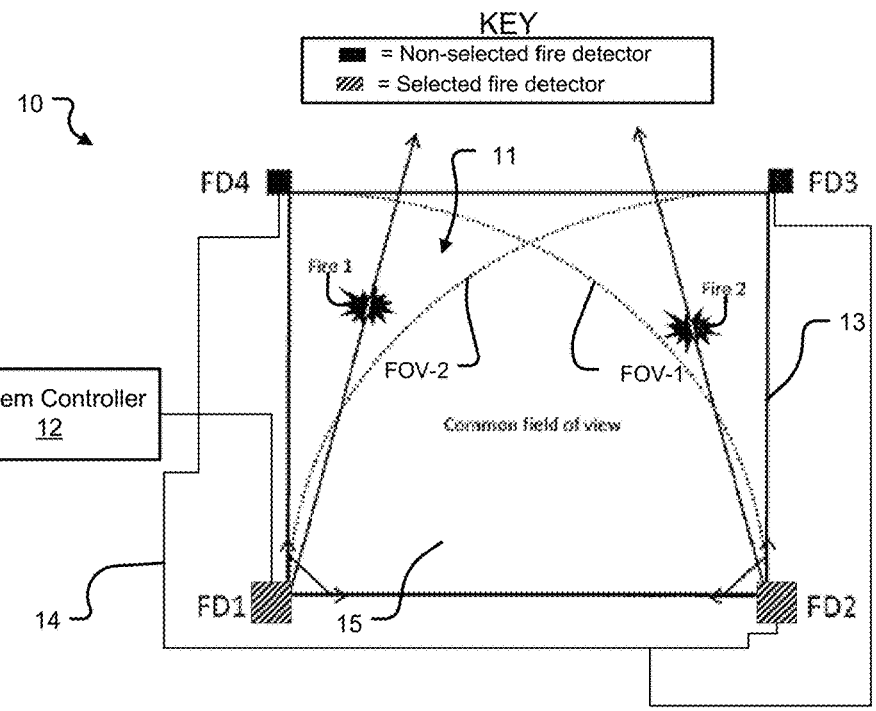
FIGS. 10A-10C are schematic drawings of the fire detection system impacted by the phenomena of fire cluster discrepancy, fire cluster center offset, and ambiguity in pairing fire clusters.

Some of the likely phenomena that may cause the incorrect pairing of the fire clusters C are cluster discrepancy (FIG. 10A), cluster center offset (FIG. 10B), and cluster enumeration ambiguity (FIG. 10C), which are described below.

In case of multiple fires (Fire 1 and Fire 2) and when all fires are not detected by both fire detectors FD1, FD2, then a pair of fire clusters reported by the fire detectors FD1, FD2 may not refer to the same fire. For example, the first fire detector FD1 refers to Fire 1 and the second fire detector FD2 refers to Fire 2 as in FIG. 10A. This is termed as the cluster discrepancy for the triangulation algorithm. If such fire clusters C are paired and processed by the triangulation algorithm, it results in the triangulation algorithm locating a phantom fire. The cluster discrepancy may be more obvious in case of small fires and in case of fires that are not visible by both fire detectors FD1, FD2.

Figure 10B:
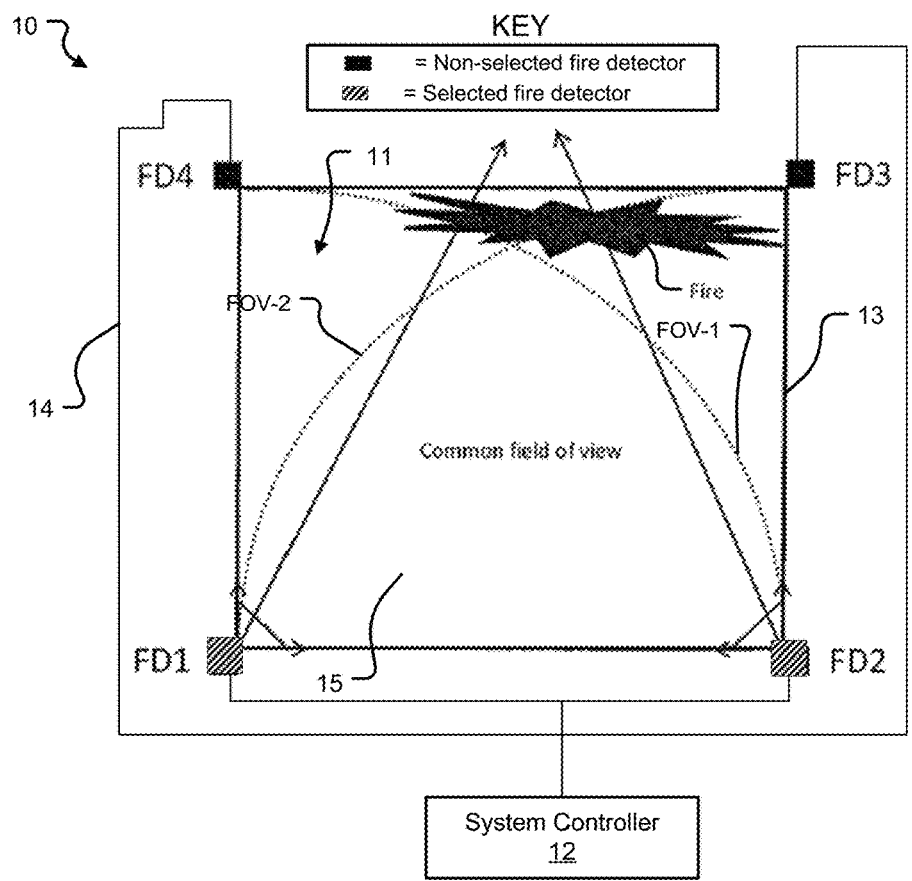

In case of a large Fire, each of the fire detectors FD1, FD2 may not have complete visibility of the Fire as shown in FIG. 10B. In such cases, fire detectors FD1 and FD2 may output cluster centers that are not truly representative of the center of the fire. Consequently, the reported cluster centers will have an associated error.

Figure 10C:
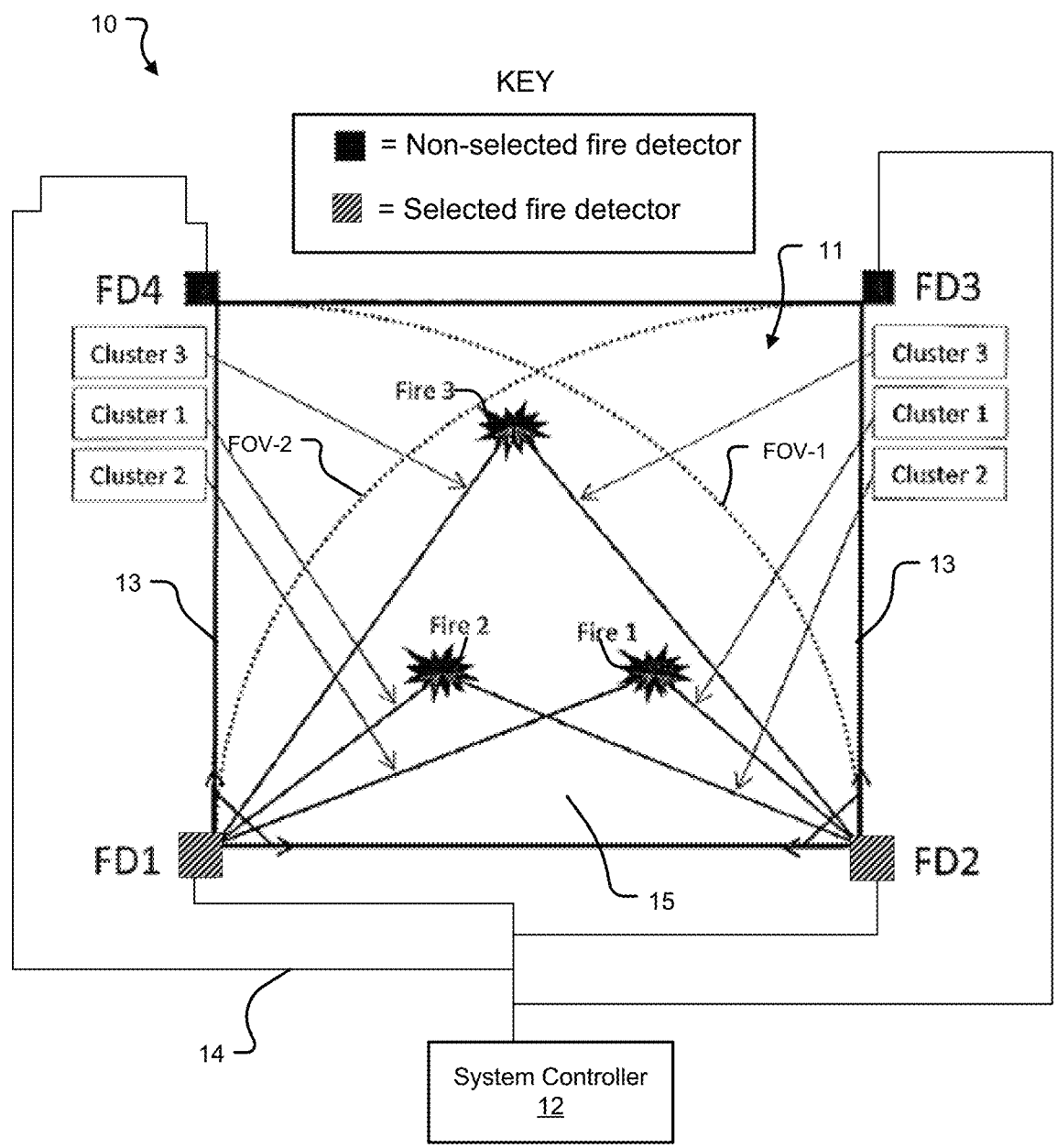

In case of multiple fires (Fire 1, Fire 2, and Fire 3) and when multiple fire clusters (fire clusters 1, 2, and 3) are reported by the fire detectors FD1, FD2, there may be cluster enumeration ambiguity. The enumeration order of the fire clusters 1-3 for the fire sources (Fires 1-3) might be different in different fire detectors FD. For example, the fire reported by cluster1 of the first fire detector FD1 may not be the same fire reported by cluster1 of the second fire detector FD2. FIG. 10C illustrates Fire 1 as represented by cluster2 on the first fire detector FD1 and cluster1 on the second fire detector FD2. Fire 2 is represented by cluster1 on the first fire detector FD1 and cluster2 on the second fire detector FD2. Fire 3 is represented by cluster3 on the first fire detector FD1 and cluster3 on the second fire detector FD2. The reasons for different enumeration of the same fire in different fire detectors FD1, FD2 are—distance of fire from fire detectors FD1, FD2, difference in perceived fire intensity, and fields of view FOV-1, FOV-2 of the fire detectors FD1, FD2. This ambiguity is termed as cluster enumeration ambiguity, which is addressed by the validation and pairing module 20.

Returning to FIG. 5, the validated fire clusters are passed to the A triangulation module 22 that computes depth information from the fire cluster information (specifically from the 2D fire cluster center data) of the fire detectors and provides 3D data output representing the fire location. "Development of a robotic local suppression system for the marine environment," located at http://www.nfpa.org/~/media/Files/Research/Research%20Foundation/foundation%20 proceedings/glockling.pdf, from The Fire Protection Research Foundation, from the National Fire Protection Foundation, and incorporated herein by reference in its entirety, describes in its Section 3.1 one way to implement a triangulation algorithm. It is quite possible that the triangulation algorithm produces multiple 3D-data outputs corresponding to a unique fire, but the actual fire location can be filtered out using different detector pairs based on the system configuration.

Figure 11:
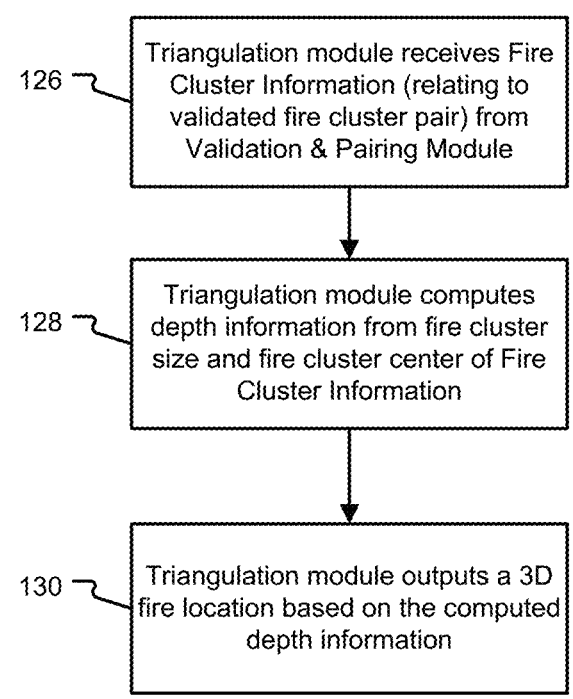
FIG. 11 is a flowchart illustrating the steps performed by a triangulation module of the system controller.

FIG. 11 illustrates the steps used to triangulate the fire cluster information to generate a 3D fire location. In step 126, the triangulation module 22 receives fire cluster information (relating to validated fire cluster pairs) from the validation & pairing module 20. Next, in step 128, the triangulation module 22 computes depth information from fire cluster size and fire cluster center of the fire cluster information. The triangulation module 22 outputs a 3D fire location based on the computed depth information (step 130).

Figure 12:
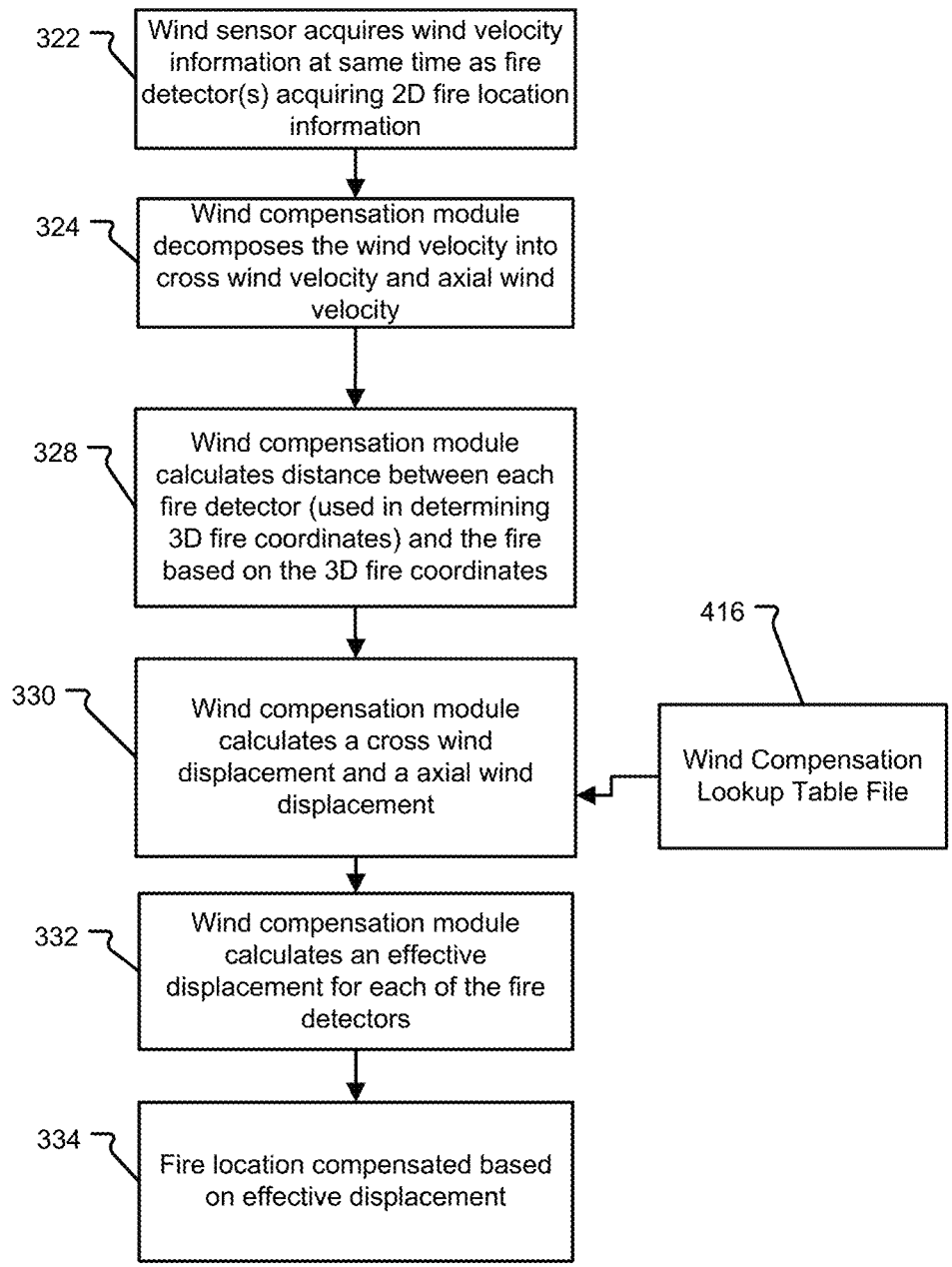
FIG. 12 is a flowchart illustrating the steps performed to compensate triangulated fire location for wind effects.

FIG. 12 illustrates the correction of the 3D fire location by the wind compensation module 310 correcting a triangulation output, i.e., a 3D fire location from the triangulation module 22, to compensate for wind effects. Here, the wind compensation module 310 compensates for wind effects to improve the fire location accuracy.

The wind has the effect of changing the instantaneous fire cluster center and fire cluster size data abruptly which impacts the triangulated fire location output. In some cases, the wind is found to be random and in such cases averaging of the 2D fire coordinates over suitable time windows may have the effect of filtering out the wind induced noise in 2D fire data. As described above, this step is performed by the preprocessor module 18 at step 60 during preprocessing of the 2D fire cluster information.

Typically, the 2D fire cluster information output from the fire detector FD is affected by the wind in the region and results in an erroneous 2D location. The effect of wind on the 2D fire cluster information output of the fire detectors FD1-FD4 can be summarized. The displacement of detected 2D fire cluster information due to wind is directly proportional to the wind speed. Further, the displacement of detected 2D fire cluster information due to wind is more for a crosswind, i.e., parallel to the plane of 2D IR sensor array 28. On the other hand, the displacement of detected 2D fire cluster information due to wind is lesser for wind which is axial, i.e., parallel to the principal optical axis of the 2D IR sensor array 28. The displacement of detected 2D fire cluster information due to wind is inversely proportional to the distance between the fire detector and the actual fire location.

In step 322, the wind sensors WS1-WS4 acquire wind velocity and direction information. In particular, when a fire is detected, 2D fire cluster information from each of the fire detectors FD1-FD4 is acquired by the system controller 12 contemporaneously with wind velocity and wind direction information from each of the wind sensors WS.

In preprocessing step 324, the measured wind velocity is broken down into cross wind and axial wind components by the wind compensation module 310.

At step 328, the 3D fire location information from the triangulation module is used to calculate a distance measurement. In particular, after triangulation, the computed 3D fire coordinates are used to calculate distance between the fire and each fire detector FD. In one embodiment, this distance calculation is made for the fire detectors that were used to determine 3D fire location information for the fire.

Based on the measured wind velocity components (cross wind and axial wind components) with respect to each fire detector FD used in the determination of the fire's location and the corresponding distance from the fire detectors FD to the fire, two components of the displacements are obtained. In particular, at step 330, a cross wind displacement and an axial wind displacement is algorithmically calculated or accessed from a lookup table based on wind velocity information and distance between the fire detectors FD and the fire.

FIG. 13 shows a wind compensation lookup table 340 including displacement information. This table provides displacement information as a function of distance to fire and measured wind speed. In one embodiment, this table is accessed to obtain both the cross wind displacement and axial wind displacement.

Returning to FIG. 12, in step 332, an effective displacement (a vector sum of the two components) is determined.

In step 334, the displacement is applied to compensate the fire location. In one example, the effective displacement is used to compensate the computed 3D fire location generated by the triangulation module. In other examples, the effective displacement is applied to the 2D fire cluster information for each of the fire detectors FD along with the range or depth information determined for each of the fire detectors to the fire. Where two fire detectors are being used in fire detection (e.g., FD1, FD2), a first effective displacement is computed based on the measured wind components and the distance between the fire and the first fire detector FD1, and a second effective displacement is computed based on the measured wind components and the distance between the fire and the second fire detector FD2.

An average displacement D can also calculated for all fire detectors used in detecting the fire.

Alternatively, the un-corrected 3D fire location information can be used by the system controller 12 along with the corresponding error entry from the look up table. The fire suppression controller may select an appropriate jet oscillation limit to compensate for the error.

The measured wind speed by the wind sensors WS is also employed by the system controller 12 in the correction to the calculated suppressant delivery trajectory to compensate for cross and axial wind components.

Figure 14:
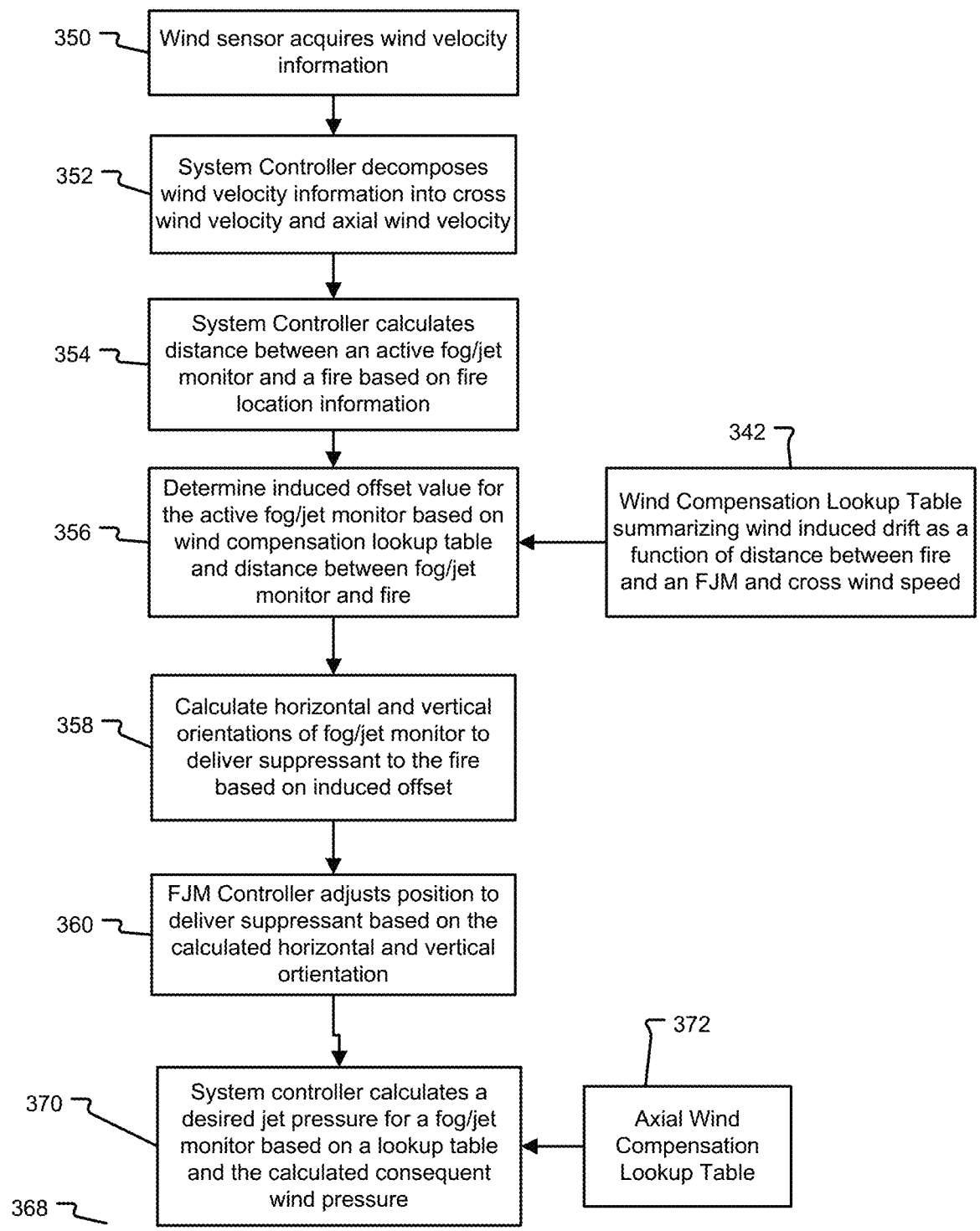
FIG. 14 is a flowchart illustrating the steps performed by the system controller to compensate for crosswind.

The overall approach for measuring and compensating for cross wind effects in suppressant delivery system are described first and illustrated in FIG. 14.

Through the wind sensor(s) WS, the effective wind velocity in the vicinity of the fire is measured in step 350. The measured wind velocity is decomposed into cross wind (along the X axis, Vwx) and axial wind (along the Z axis, Vwz) in step 352. In one example, the X axis, Vwx Z axis, Vwz are determined within a coordinate system defined by the particular monitor that is used to suppress the fire.

So, for example with reference to FIG. 1, if both of the monitors FJM1 and FJM2 are to be activated by the system controller 12 to deploy suppressant, the cross wind velocity Vwx and the axial wind velocity Vwz are calculated individually for each monitor and with respect to each monitor's coordinate system.

For a triangulated fire location (X, Y, Z) generated by the triangulation module, distance between each FJM and fire, d, is calculated in step 354.

In step 356, the induced offset Evwd is determined. In some examples, the offset is calculated. In an illustrated example, an offset lookup table 342 is accessed.

FIG. 15 illustrates an example of the offset lookup table 342. Each column corresponds to a different crosswind speed. Each row corresponds to a different range between the FJM and the triangulated fire location.

The horizontal and vertical orientation of each FJM is calculated to deliver suppressant to the location ((X−Evwd), Y, Z) instead of (X, Y, Z) in step 358 of FIG. 14. The system controller 12 adjusts the position of FJM1 and/or FJM2 to deliver suppressant based on the compensated location in step 360. Then, due to the cross wind effect, the suppressant will be diverted to the real intended target (X, Y, Z).

It is also useful to provide correction to calculated suppressant delivery trajectory to compensate for axial wind (Head Wind/Tail Wind). The axial wind is classified as either head wind or tail wind based on whether the axial wind is opposing or aiding the jet respectively.

The jet in air will have free surface aeration in line with jet interface, which reduces the jet momentum and creates turbulence. The resultant and direction of the head and tail wind can further be converted into wind force and consequent wind pressure based on aerodynamics calculations.

In step 370, the system controller 12 accesses an axial wind compensation table 372 to determine the optimal jet pressure for the FJM based on the wind speed and whether the wind is a head wind or a tail wind. The system controller 12 then signals the FJMs to deploy suppressant based on the pressure indicated by the table 372.

Figure 16:
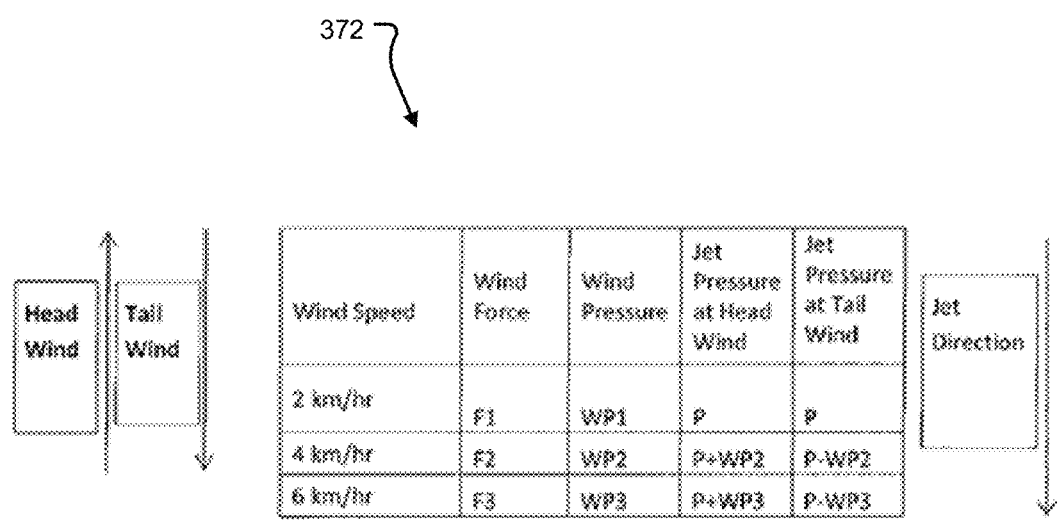
FIG. 16 shows an exemplary axial wind compensation table providing for a variety of wind speeds, the associated wind force, wind pressure and jet pressure setting both for a head wind and a tail wind.

FIG. 16 shows an exemplary axial wind compensation table. It shows for a variety of wind speeds, the associated wind force, wind pressure and jet pressure setting both for a head wind and a tail wind.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fire detection system for correcting fire detection based on wind, the system comprising:
   fire detectors for acquiring two-dimensional fire location information for a fire;
   a wind sensor for acquiring wind information; and
   a system controller for determining three-dimensional fire location information based on the two-dimensional fire location information from the fire detectors and compensating the three-dimensional fire location information based on the wind information, wherein the system controller averages the two-dimensional fire location information over time to filter out wind induced noise in the two-dimensional fire location information from the fire detectors.

2. A fire detection system as claimed in claim 1, wherein each fire detector comprises a two-dimensional infrared sensor array that generates the two-dimensional fire location information.

3. A fire detection system as claimed in claim 1, wherein the system controller calculates a cross wind velocity for a coordinate system of the fire detectors.

4. The fire detection system of claim 1, wherein the system controller determines the compensation by accessing a wind compensation lookup table.

5. A fire detection method for correcting fire detection based on wind, the method comprising:
acquiring two-dimensional fire location information for a fire with fire detectors;
acquiring wind information for the fire;
determining three-dimensional fire location information based on the two-dimensional fire location information from the fire detectors; and
compensating the three-dimensional fire location information based on the wind information; and
averaging the two-dimensional fire location information over time to filter out wind induced noise in the two-dimensional fire location information from the fire detectors.

6. A fire detection method as claimed in claim 5, further comprising determining a cross wind velocity for a coordinate system of the fire detectors.

7. The fire detection method as claimed in claim 5, further comprising determining the compensation by accessing a wind compensation lookup table.

8. A system for correcting fire suppression based on wind, the system comprising:
fire detectors for acquiring two-dimensional fire location information for a fire;
a wind sensor for acquiring wind information;
monitors for deploying fire suppressant; and
a system controller for determining three-dimensional fire location information based on the two-dimensional fire location information from the fire detectors, for controlling the monitors based on a distance between the monitors and the fire and the wind information by determining a cross wind component and an axial wind component from the wind information for the monitors and within a coordinate system of each of the monitors, wherein the cross wind component and the axial wind component are calculated individually for each of the monitors and with respect to the coordinate system of each of the monitors, the system controller controlling a horizontal and vertical orientation of the monitors based on the cross wind component.

9. A system for correcting fire suppression based on wind, the system comprising:
fire detectors for acquiring two-dimensional fire location information for a fire;
a wind sensor for acquiring wind information;
monitors for deploying fire suppressant; and
a system controller for determining three-dimensional fire location information based on the two-dimensional fire location information from the fire detectors, for controlling the monitors based on a distance between the monitors and the fire and the wind information by determining a cross wind component and an axial wind component from the wind information for each of the monitors, wherein the cross wind component and the axial wind component are calculated individually for each of the monitors and with respect to the coordinate system of each of the monitors, wherein the system controller controls a jet pressure of the monitors based on the axial wind component.

10. A method for correcting fire suppression based on wind, the method comprising:
averaging the two-dimensional fire location information over time to filter out wind induced noise in the two-dimensional fire location information from fire detectors;
determining three-dimensional fire location information of a fire based on the two-dimensional fire location information from the fire detectors;
acquiring wind information;
controlling deployment of tire suppressant based on a distance between a monitor and the fire and the wind information.

11. A method as claimed in claim 10, further comprising determining a cross wind component and an axial wind component from the wind information.

12. A system as claimed in claim 11, further comprising controlling a horizontal and vertical orientation of the monitor based on the cross wind component.

13. A system as claimed in claim 11, further comprising controlling a jet pressure of the monitor based on the axial wind component.

* * * * *

UNITED STATES PATENT AND TRADEMARK OFFICE
CERTIFICATE OF CORRECTION

PATENT NO.        : 10,573,145 B2
APPLICATION NO.   : 15/973001
DATED             : February 25, 2020
INVENTOR(S)       : Manjuprakash Rama Rao et al.

It is certified that error appears in the above-identified patent and that said Letters Patent is hereby corrected as shown below:

In the Claims

Claim 10, Column 12, Line 38, delete "controlling deployment of tire suppressant based on a" and insert --controlling deployment of fire suppressant based on a--.

Signed and Sealed this
Seventh Day of April, 2020

Andrei Iancu
*Director of the United States Patent and Trademark Office*